US011660711B2

(12) United States Patent
Kaniowski et al.

(10) Patent No.: US 11,660,711 B2
(45) Date of Patent: May 30, 2023

(54) RADIALLY OUTWARD ORBITAL WELDING TECHNIQUE AS A JOINING METHOD USED FOR INNER TUBE TO FITTING CONNECTIONS IN DOUBLE WALL TUBE CONFIGURATIONS

(71) Applicant: United Technologies Corporation, Farmington, CT (US)

(72) Inventors: Pawel Kaniowski, Cromwell, CT (US); Piotr Kaczor, Bochnia (PL); Robert Wozniak, Lapanow (PL); Wangen Lin, South Glastonbury, CT (US); Christopher A. Sanchez, Charlton City, MA (US)

(73) Assignee: Raytheon Technologies Corporation, Farmington, CT (US)

( * ) Notice: Subject to any disclaimer, the term of this patent is extended or adjusted under 35 U.S.C. 154(b) by 1028 days.

(21) Appl. No.: 16/433,389

(22) Filed: Jun. 6, 2019

(65) Prior Publication Data
US 2020/0384584 A1  Dec. 10, 2020

(51) Int. Cl.
| | | |
|---|---|---|
| *B23K 37/053* | (2006.01) | |
| *B23K 37/02* | (2006.01) | |
| *B23K 9/16* | (2006.01) | |
| *B23K 9/028* | (2006.01) | |
| *B23K 9/00* | (2006.01) | |
| *B23K 101/04* | (2006.01) | |

(52) U.S. Cl.
CPC ........ *B23K 37/0536* (2013.01); *B23K 9/0026* (2013.01); *B23K 9/0282* (2013.01); *B23K 9/0288* (2013.01); *B23K 9/16* (2013.01); *B23K 37/027* (2013.01); *B23K 37/0276* (2013.01); *B23K 2101/04* (2018.08)

(58) Field of Classification Search
None
See application file for complete search history.

(56) References Cited

U.S. PATENT DOCUMENTS

| | | |
|---|---|---|
| 9,829,124 B2 | 11/2017 | Dill |
| 9,982,821 B1 | 5/2018 | Scheiferstein et al. |
| 2005/0011928 A1* | 1/2005 | Dick ............... B23K 37/0533 228/49.5 |

(Continued)

FOREIGN PATENT DOCUMENTS

| | | |
|---|---|---|
| CN | 106041271 A | * 10/2016 |
| CN | 208703373 U | * 4/2019 |

(Continued)

OTHER PUBLICATIONS

Machine translation of CN-106041271-A, dated Dec. 2022.*

(Continued)

*Primary Examiner* — Geoffrey S Evans
(74) *Attorney, Agent, or Firm* — Bachman & LaPointe, P.C.

(57) ABSTRACT

A process of welding fittings to ends of a double wall pipe comprising forming a first welded joint between an inner pipe and an inner receiver of a first fitting; forming a second welded joint between an outer pipe and an outer receiver of the first fitting; forming a third welded joint between the outer pipe and an outer receiver of a second fitting; and forming a fourth welded joint between the inner pipe and an inner receiver of the second fitting.

18 Claims, 5 Drawing Sheets

(56) References Cited

U.S. PATENT DOCUMENTS

| | | | |
|---|---|---|---|
| 2006/0157536 A1* | 7/2006 | Wolf | B23K 9/0286 |
| | | | 228/101 |
| 2010/0018599 A1 | 1/2010 | Ferrer et al. | |
| 2017/0336007 A1* | 11/2017 | Rappitsch | B64D 37/005 |
| 2018/0066781 A1 | 3/2018 | Sanchez | |

FOREIGN PATENT DOCUMENTS

| | | | |
|---|---|---|---|
| CN | 208703373 U | 4/2019 | |
| DE | 2144799 B1 | 12/1972 | |
| DE | 10303909 A1 | 8/2004 | |
| EP | 2957804 A1 * | 12/2015 | F16L 23/167 |
| EP | 2957805 A1 * | 12/2015 | F02C 7/22 |
| EP | 3296053 A1 * | 3/2018 | B23K 31/027 |
| EP | 3296053 A1 | 3/2018 | |
| GB | 2035871 A * | 6/1980 | B23K 9/0288 |
| WO | 2009109950 A2 | 9/2009 | |
| WO | WO-2020156599 A1 * | 8/2020 | B23K 37/0217 |

OTHER PUBLICATIONS

Machine translation of CN-208703373-U, dated Dec. 2022.*
Machine translation of WO-2020156599-A1, dated Dec. 2022.*
EP Search Report dated Nov. 2, 2020 issued for corresponding European Patent Application No. 20178106.9.

\* cited by examiner

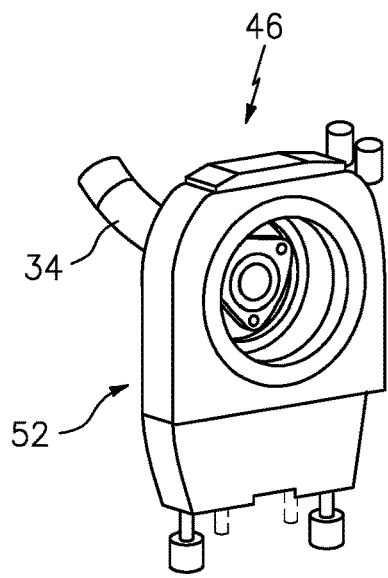
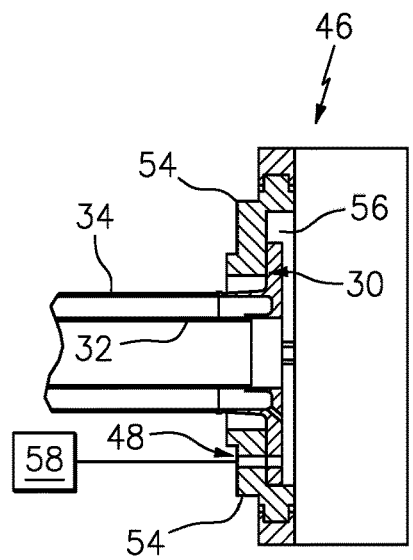
FIG. 6  FIG. 7
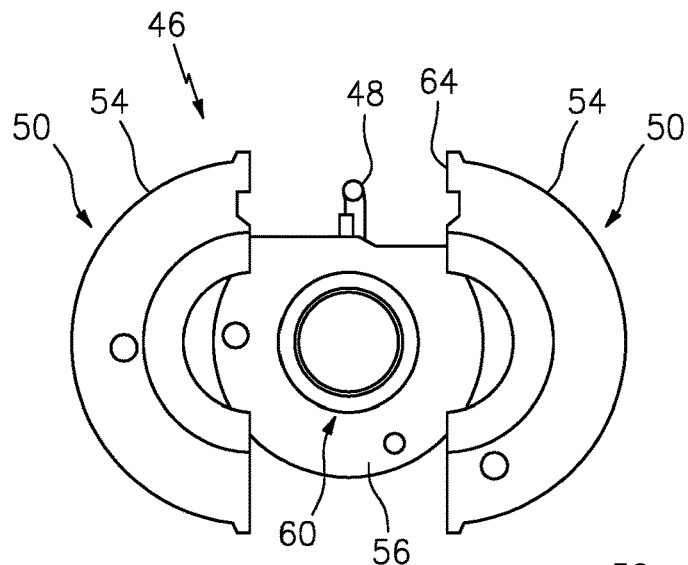
FIG. 8
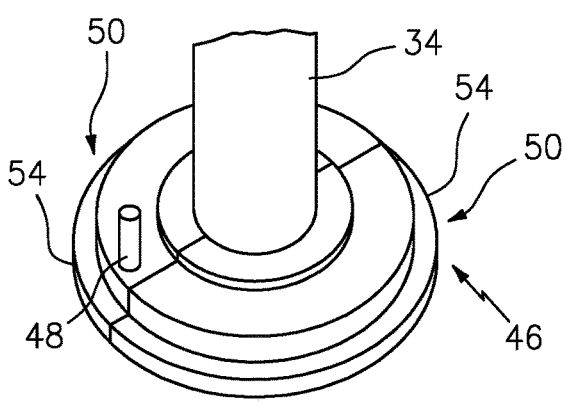
FIG. 9

RADIALLY OUTWARD ORBITAL WELDING TECHNIQUE AS A JOINING METHOD USED FOR INNER TUBE TO FITTING CONNECTIONS IN DOUBLE WALL TUBE CONFIGURATIONS

BACKGROUND

The present disclosure is directed to an arc welding process to create joints needed for the manufacturing of a double wall tube. More particularly, present disclosure is directed to a process that couples double wall pipes and associated couplings that allow leaked fluids to be transmitted to a suitable drain point.

Double wall pipes in gas turbine engines employ couplings that use high cost flanges that are associated with expensive and inefficient processing. Attachment of the flanges may involve several processing steps including, for example, welding, swaging, and brazing. Moreover, the processing costs account for the majority of the fabrication costs of doubled wall pipe configurations.

The joint for the double wall tube requires that the gap between the tube and the end fitting be fully sealed. Unfortunately, a brazing process is only capable of achieving 80% braze coverage, not 100% braze coverage. A risk exists that the potential 20% lack of coverage may form a path for leakage. In order to manage this risk, a specialized inspection method is needed to guarantee that there is no path for leakage. This specialized inspection method comes with the use of more expensive braze process. An inspection method such as X-ray or leak test is needed to capture any potential escape. The X-ray added significant cost as the double wall tube design is very difficult for meeting the inspection requirements. In many cases, multiple X-ray shots are required.

What is needed is a process of joining fittings to double walled tube without the need to braze the final inner tube to fitting joint to reduce production costs.

SUMMARY

In accordance with the present disclosure, there is provided a process of welding fittings to ends of a double wall pipe, the process comprising forming a first welded joint between an inner pipe and an inner receiver of a first fitting; forming a second welded joint between an outer pipe and an outer receiver of the first fitting; forming a third welded joint between the outer pipe and an outer receiver of a second fitting; and forming a fourth welded joint between the inner pipe and an inner receiver of the second fitting.

In another and alternative embodiment, the fourth welded joint comprises a welded lap fillet joint or a full penetration groove welded joint.

In another and alternative embodiment, the process further comprises placing an assembly of the second fitting and the inner pipe and outer pipe into a fixture; the fixture comprising a set of collets configured to retain the assembly of the second fitting and the inner pipe and outer pipe; a backing plate coupled to the set of collets, the backing plate being fluidly coupled to the second fitting; and a conduit fluidly coupled to the backing plate; the conduit configured to fluidly couple a gas source to the backing plate.

In another and alternative embodiment, the gas source comprises an inert shielding gas, further comprising flowing the inert shielding gas through the conduit to a groove formed in the backing plate; flowing the inert shielding gas from the groove through the second fitting into a chamber formed between the inner pipe and the outer pipe to protect the fourth welded joint.

In another and alternative embodiment, the process further comprises installing the fixture within an orbital welding device; and aligning a welding electrode with the inner pipe and an inner receiver of the second fitting.

In another and alternative embodiment, the process further comprises clamping the assembly of the second fitting and the inner pipe and outer pipe in a biasing member formed by the set of collets and the backing plate.

In another and alternative embodiment, the process further comprises sealing the fourth welded joint between the inner pipe and an inner receiver of the second fitting by using an arc energy to melt either a full or a partial thickness of the fitting with the inner pipe.

In accordance with the present disclosure, there is provided a welding fixture comprising a set of collets configured to retain an assembly of a second fitting and an inner pipe and an outer pipe; a backing plate coupled to the set of collets, the backing plate being fluidly coupled to the second fitting; and a conduit fluidly coupled to the backing plate; the conduit configured to fluidly couple a gas source to the backing plate.

In another and alternative embodiment, the welding fixture further comprises a groove formed in the backing plate, the groove fluidly coupled to the conduit and fluidly coupled to the second fitting.

In another and alternative embodiment, the fixture is configured to mount into an orbital welding device.

In another and alternative embodiment, the orbital welding device includes a housing supporting an orbital welding head and adaptor configured to mount a welding electrode proximate an inner diameter of a joint between the inner pipe and an inner receiver of the fitting.

In another and alternative embodiment, the welding electrode is configured to form a welded lap fillet joint between the inner pipe and the inner receiver of the fitting.

In another and alternative embodiment, the welding electrode is positioned relative to the inner pipe inner diameter and configured for making a radially outward weld in a gap between the inner pipe and the fitting, wherein the gap is sealed by melting either a full or a partial thickness of the fitting with the inner pipe.

In accordance with the present disclosure, there is provided a process of joining a double walled pipe with a fitting, the process comprising placing an assembly of a fitting and an inner pipe and an outer pipe into a fixture, wherein the fitting and the outer pipe have a first welded joint; mounting the fixture into an orbital welding device; positioning a welding electrode relative to an inner diameter of the inner pipe proximate an inner receiver of the fitting; and forming a second welded joint between the inner pipe and the inner receiver.

In another and alternative embodiment, the second welded joint is formed with a radially outward weld in a gap between the inner pipe and inner receiver of the fitting.

In another and alternative embodiment, the second welded joint comprises a welded lap fillet joint or a full penetration groove welded joint.

In another and alternative embodiment, the fixture comprises a set of collets configured to retain the assembly of the fitting and the inner pipe and outer pipe; a backing plate coupled to the set of collets, the backing plate being fluidly coupled to the fitting; and a conduit fluidly coupled to the backing plate; the conduit configured to fluidly couple a gas source to the backing plate; flowing the inert shielding gas through the conduit to a groove formed in the backing plate; and flowing the inert shielding gas from the groove through the fitting into a chamber formed between the inner pipe and the outer pipe to protect the second welded joint.

In another and alternative embodiment, the process further comprises making the second weld as a radially outward weld in a gap between the inner pipe and the inner receiver of the fitting, wherein the gap is sealed by melting either a full or a partial thickness of the inner receiver of the fitting with the inner pipe.

In another and alternative embodiment, the second weld comprises one of an orbital welding technique or a manual gas tungsten arc welding technique.

Other details of the joining process are set forth in the following detailed description and the accompanying drawings wherein like reference numerals depict like elements.

BRIEF DESCRIPTION OF THE DRAWINGS

FIG. 6 is an isometric schematic representation of an exemplary orbital welding head with double wall tube and fitting.

FIG. 7 is a cross sectional representation of an exemplary orbital welding head with double wall tube and fitting.

FIG. 8 is a schematic representation of an exemplary fixture.

FIG. 9 is a schematic representation of an exemplary fixture and double wall tube inserted into the fixture.

DETAILED DESCRIPTION

Figure 1:
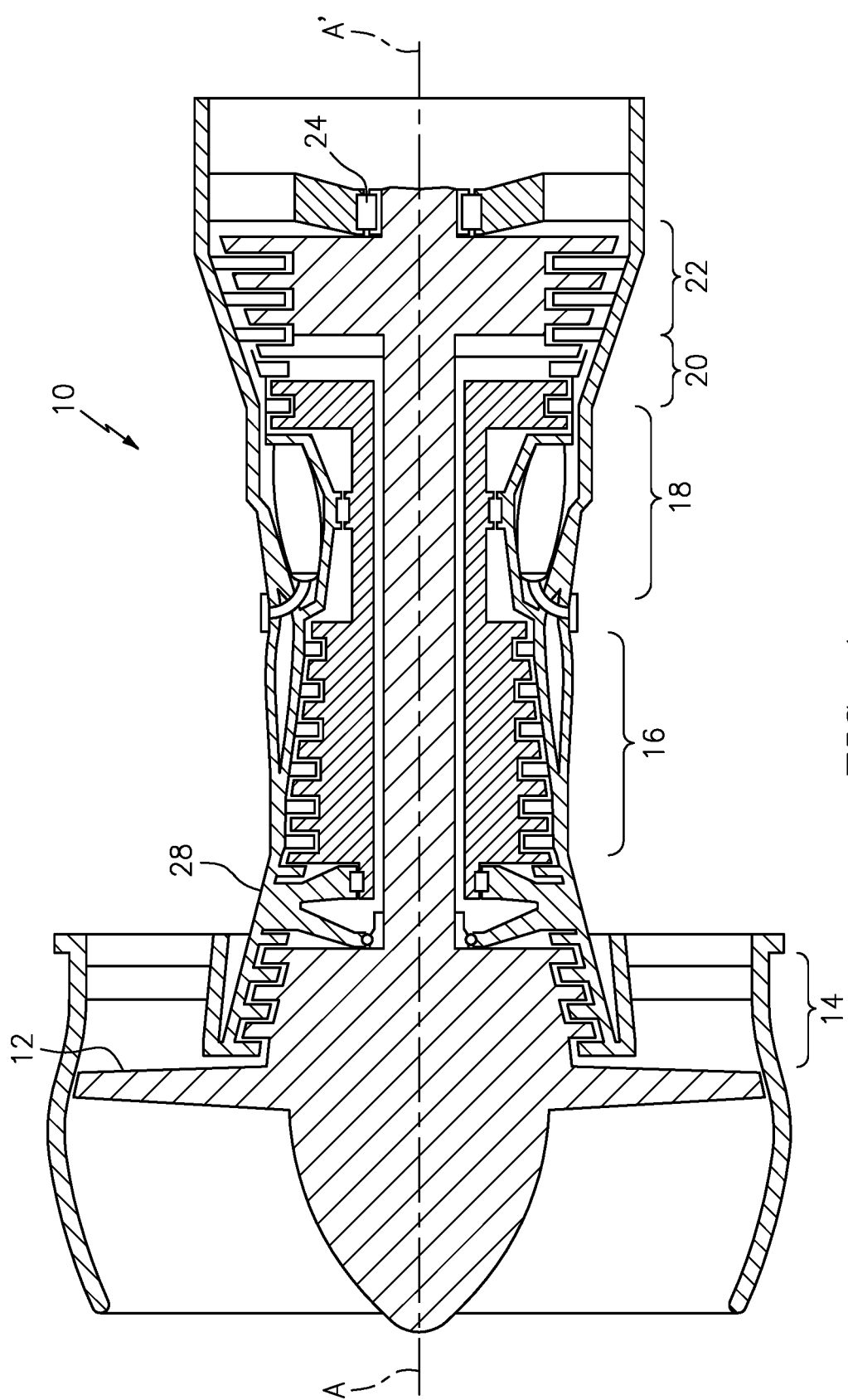
FIG. 1 illustrates cross-sectional view of an exemplary gas turbine engine, in accordance with various embodiments.

Referring to FIG. 1, a gas turbine engine 10 (such as a turbofan gas turbine engine) is illustrated according to various embodiments. Gas turbine engine 10 is disposed about axial centerline axis A-A', which may also be referred to as axis of rotation A-A'. Gas turbine engine 10 may comprise a fan 12, compressor sections 14 and 16, a combustion section 18, and turbine sections 20, 22. Air compressed in the compressor sections 14, 16 may be mixed with fuel and burned in combustion section 18 and expanded across the turbine sections 20, 22. The turbine sections 20, 22 may include high pressure rotors and low pressure rotors, which rotate in response to the expansion.

The turbine sections 20, 22 may comprise alternating rows of rotary airfoils or blades and static airfoils or vanes. Cooling air may be supplied to the turbine sections 20, 22 from the compressor sections 14, 16. A plurality of bearings 24 may support spools in the gas turbine engine 10. FIG. 1 provides a general understanding of the sections in a gas turbine engine, and is not intended to limit the disclosure.

The present disclosure may extend to all types of turbine engines, including turbofan gas turbine engines and turbojet engines, for all types of applications.

The forward-aft positions of gas turbine engine 10 lie along axis of rotation A-A'. For example, fan 12 may be referred to as forward of turbine section 20 and turbine section 20 may be referred to as aft of fan 12. Typically, during operation of gas turbine engine 10, air flows from forward to aft, for example, from fan 12 to turbine section 29. As air flows from fan 12 to the more aft components of gas turbine engine 10, axis of rotation A-A' may also generally define the direction of the air stream flow.

In various embodiments, double wall pipes 26 may be employed to transport fluids, and particularly, flammable fluids, through aircraft structures and in aircraft volumes (e.g., along the engine cage). These double wall pipes 26 typically are associated with expensive and resource intensive manufacturing processes. For example, typical double wall pipe assemblies may employ orbital welds, swaging, and brazing of flanges. However, these swaging and brazing processes may be expensive and time-consuming.

Figure 2:
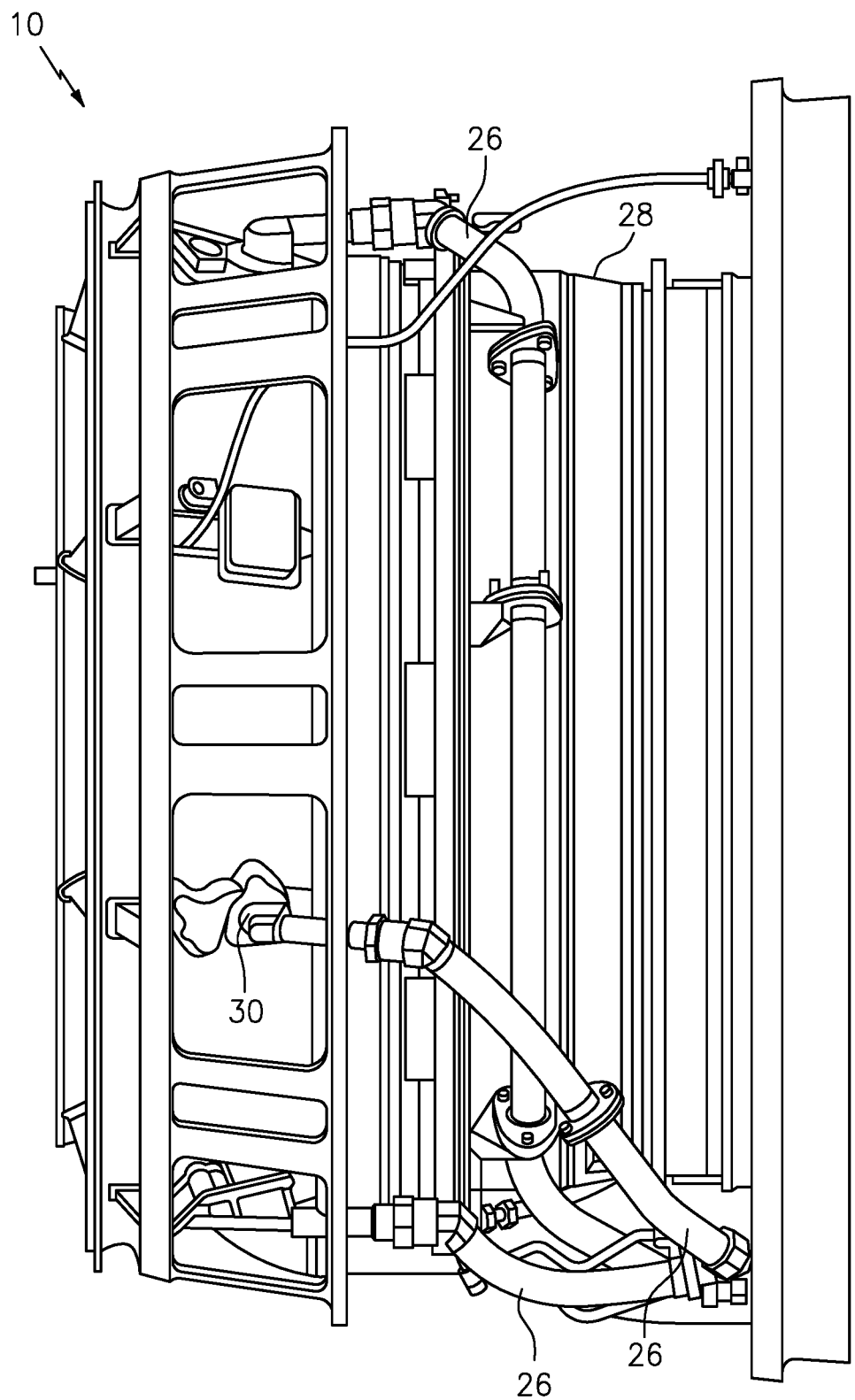
FIG. 2 illustrates a side view of an exemplary portion of a gas turbine engine case, in accordance with various embodiments.

The double wall pipes 26 defined herein are described in the context of use in aerospace applications, and in particular, in the context of use in conjunction with gas turbine engines including, for example, gas turbine engine 10 as shown in FIG. 1 and FIG. 2. However, the double wall pipe 26 configurations described herein may be used in any suitable double wall pipe application and/or environment. As such, the description of the double wall pipes 26 in the context of a gas turbine engine is for illustrative purposes only and is not intended to limit the application.

In various embodiments and with reference to FIG. 1 and FIG. 2, double wall pipe 26 may run along a portion of or along the outside perimeter of case 28. Case 28 may be any suitable portion of the case surrounding engine components of gas turbine engine 10. For example, case 28 may be the case surrounding all or a portion of compressor section 14, compressor section 16, combustor 18, turbine section 20, and/or turbine section 22. Moreover, case 28 may cover one or more of the components that make up gas turbine engine 10. Similarly, double wall pipe 26 may move fluid from one section of gas turbine engine 10 to another section of gas turbine engine 10 along and outside case 28.

In various embodiments, gas turbine engine 10 and/or case 28 may comprise one or more double wall pipes 26 including, for example, double wall pipe 26 in FIG. 2. Double wall pipe 26 may include any suitable flange coupling and/or fitting. For example double wall pipe 26 may comprise a (second) fitting 30 that is configured to interface with case 28.

Figure 3:
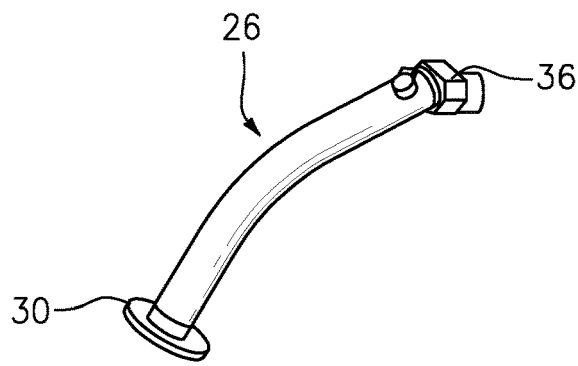
FIG. 3 is a schematic representation of an exemplary double wall tube with fittings.
Figure 4:
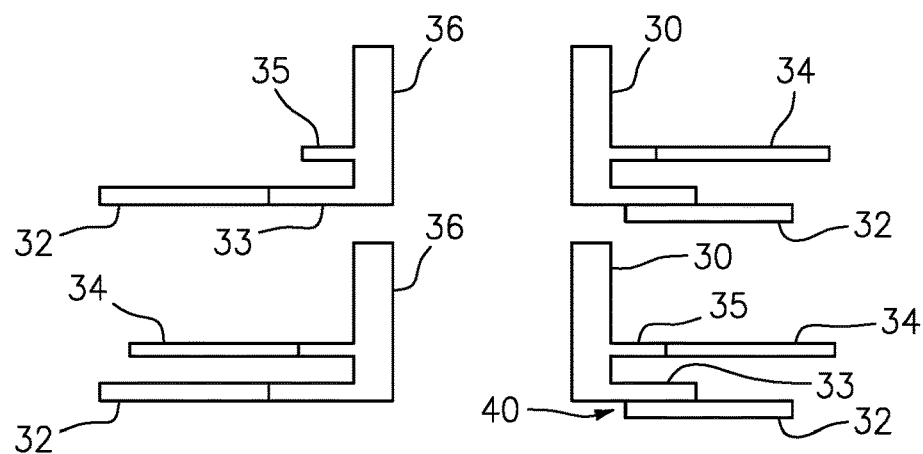
FIG. 4 is a schematic representation of a sequence of an exemplary process for coupling the double wall tube with a fitting.
Figure 5:
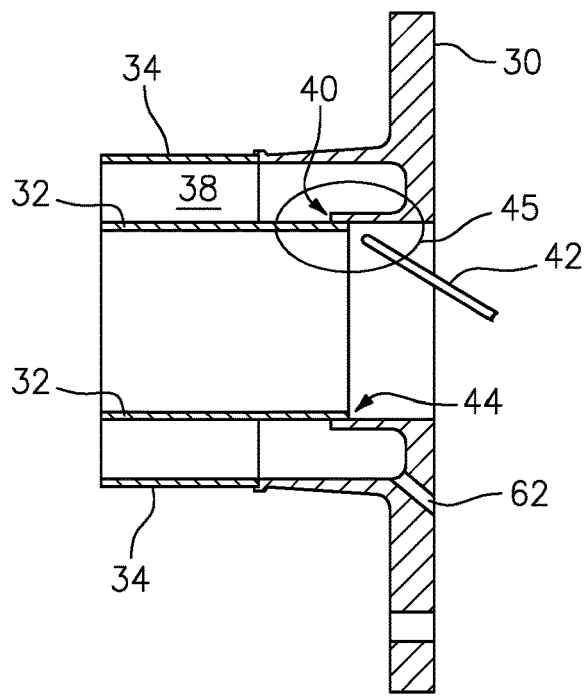
FIG. 5 is a cross sectional schematic representation of an exemplary double wall tube and fitting coupled together.

In various embodiments with reference to FIG. 3 through FIG. 5. Double wall pipe 26 may comprise an inner pipe (first pipe) 32 and an outer pipe (second pipe) 34. First pipe 32 and second pipe 34 may be operatively coupled to a fitting (first fitting) 36 at an inner receiver 33 and an outer receiver 35 of the fitting 36 (e.g., by orbital weld). Second pipe 34 may sleeve over and/or be installed over first pipe 32. Second pipe 34 may be operably coupled to fitting 36 (e.g., by orbital welding). In this regard, double wall pipe 26 may comprise a chamber 38 and/or a channel between first pipe 32 and second pipe 34.

The inner pipe 32 is configured to carry oil or fuel. The chamber 38 between the inner pipe 32 and the outer pipe 34 is the space to collect potential leakage from the inner pipe 32. Any fluid leaked from first pipe 32 may be contained in and/or conducted through the chamber 38 to a suitable drainage point.

In certain applications the geometry of the double wall pipe 26 may need to be bent to accommodate the needed complex configuration. A popular solution to address the required complex geometry is to connect multiple double wall pipe 26 into a long continuous pipe 26 and use the coupling 30 between two double wall pipes 26 to handle bending or any change of orientation. When multiple double wall pipes 26 connect into one, the inner pipe 32 as well as the spacing between the inner pipe 32 and the outer pipe 34 have to be connected to enable passage of the liquid. The chamber 38 between the inner pipe 32 and the outer pipe 34 would direct the liquid to a drainage location. The drainage provides evidence if leakage of the inner pipe 32 occurs.

The inner pipe 32, the outer pipe 34 and two end fittings 36, 30 (one at each end) are required to produce a single double wall pipe 26.

As illustrated in FIG. 4 and FIG. 5, the double wall pipe 26 can be assembled by first joining the inner pipe 32 to the first fitting 36 by use of an arc welding process. The outer pipe 34 is then attached to the first fitting 36 by use of an arc welding process. The outer pipe 34 can then be joined to the second fitting 30 by use of an arc welding process. However the arc welding process can only be used to produce one inner pipe 32 joint and two outer pipe 32 joints. There is no space for the gas tungsten arc welding torch to access the joint 40 between last inner pipe 32 and second fitting 30, If arc welding methods are used as shown in the prior art, a space needs to be created in the other tube. The space will need to be closed by using an additional welding or brazing process. Therefore, a brazing method was used in the prior art to produce the last inner pipe 32 to fitting 30 at joint 40.

As shown in FIG. 4 and FIG. 5, the disclosed joining process uses an innovative welding method to replace the prior art braze joint. The joint 40 design illustrated is a welded lap fillet joint. In an alternative embodiment, a full penetration groove weld, if desired, can be achieved by the method disclosed.

The arc welding process disclosed is configured to make all four joints needed for the manufacturing of the double wall pipe 26. The prior art brazing process is replaced by an arc welding process as schematically shown in FIG. 4 and FIG. 5. The arc weld is produced without the need of accessibility from an outer diameter by making a radially outward weld, (radially outward orbital welding technique).

An arc torch 42 is positioned at the inner diameter 44 of the inner pipe 32. The arc weld 45 is formed and the gap between inner pipe 32 and the fitting 30 is sealed by using the arc energy to melt either full or partial thickness of the fitting 30 with the inner pipe 32. The full thickness of the fitting 30 is melted by the arc, the inner pipe 32 arc weld 45 indicated by a circle in FIG. 5. In an alternative embodiment, the partial thickness of the fitting 30 is melted by the arc. Either weld would provide the required structural integrity and sealing function.

The radially outward weld 45 may be made by either using an orbital welding process or a manual gas tungsten arc welding method. The orbital welding process is a mechanized gas tungsten arc welding process designed in such a way that the gas tungsten arc welding torch 42 rotates while the fitting 30 and pipe 32 are kept stationary during welding. An orbital welding process is preferred over the manual arc welding process due to its superior process control and better consistency in the weld geometry and material properties. A manual gas tungsten arc welding process may be used when the use of an orbital welding process is not possible due to fitting 30 geometry.

Either the orbital welding process or the manual gas tungsten arc welding process requires the use of a fixture 46, as seen in FIG. 6 through FIG. 11 designed to hold the fitting 30 and pipe 32, 34 during welding. The fixture 46 can include backing plate 56 as shown in FIG. 8. The backing plate can include a conduit 48 for injection of an inert gas (not shown) to flow into the chamber 38 between the inner pipe 32 and outer pipe 34 to protect the back side of the weld from oxidation during welding. The fixture 46 can also include a biasing member 50 enabling the pipe 32, 34 and fitting 30 to be tightly held during welding by accommodating the part to part dimensional variations of both the pipe 32, 34 and fitting 30. The biasing member 50 includes two separate collets 54 enabling the assembly and disassembly of pipe 32, 34 with fitting 30 before and after welding.

A cross section of the pipe/fitting assembly held by the fixture 46 is shown in FIG. 7. FIG. 6 illustrates the pipe 32, 34 fitting 30 assembly held inside an orbital welding device 52 ready for welding. The fixture 46 includes a set of collets 54 that cooperate with a backing plate 56. The collets 54 and backing plate 56 are configured to retain the pipe 32, 34 fitting 30 assembly. The fixture 46 is mounted in the orbital welding device 52 in preparation for welding.

The fixture 46 includes the backing plate 56 and two pieces of the clamping collet 54. FIG. 8 shows these 3 separate pieces of the fixture 46. FIG. 9 shows the pipe 32, 34/fixture 30 assembly is held by the fixture 46. The pipe 32, 34/fixture 30 assembly is held in between the backing plate 56 and the clamping collets 54. The backing plate 56 includes the unique feature of the conduit 48 for connecting to an external source 58 of inert shielding gas. The shielding gas passes through the conduit 48 to reach a built-in groove 60. When the pipe 32, 34/fixture 30 assembly is held by the fixture 46, the groove 60 can be in contact with the fitting 30 and communicate with the chamber 38 between the inner pipe 32 and the outer pipe 34. There are holes 62 in the fitting 30 for any potential leakage liquid to flow through and to reach the eventual drainage location. The same holes 62 are used for the passage of the inert shielding gas 58 to reach the chamber 38 and to protect the back side of the weld from oxidation during welding. The biasing member 50 includes several slots 64 on the two clamping collets 54. Under clamping force, the slots 64 provide a space for the collets 54 to move, thus, acting like a spring.

Figure 10:
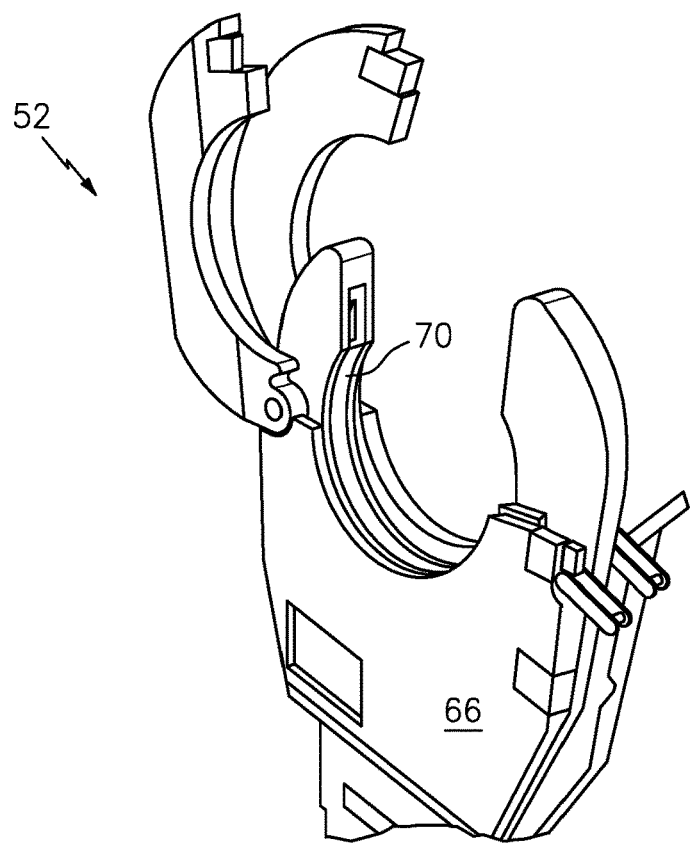
FIG. 10 is a schematic representation of an exemplary welding machine adapted for the exemplary fixture.
Figure 11:
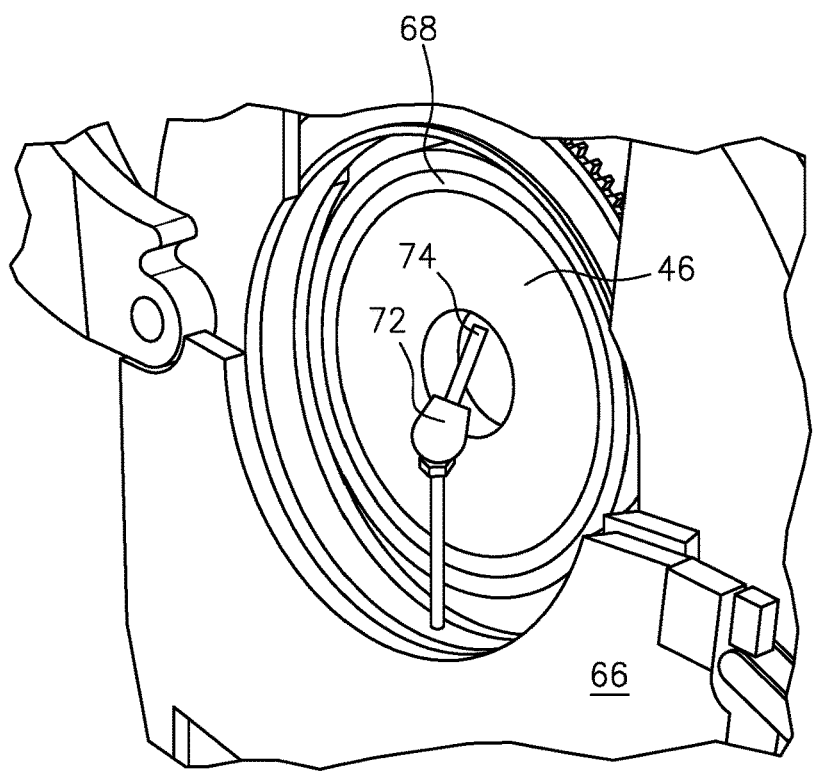
FIG. 11 is a schematic representation of the exemplary welding machine with welding adapter installed.

FIG. 10 and FIG. 11 show the setup of orbital welding process before (FIG. 10) and after (FIG. 11) the pipe 32, 34/fixture 30 assembly is placed in the welding fixture 46 which is mounted in the orbital welding device 52 in preparation for welding. The orbital welding device 52 includes a housing 66 that supports an orbital welding head 68. A rotor 70 is supported by the housing 66. The orbital welding device 52 also includes an adaptor 72 for the welding electrode 74. The welding electrode is mounted on adapter 72. During welding, a motor (not shown) inside the housing 66 drives the rotor 70 in rotation. The rotor can carry the welding electrode 74 via adapter 72 to complete the rotation of an entire circle, thus, complete the orbital weld.

A technical advantage of the process is the capability to use the orbital welding process to make the lap fillet weld or full penetration groove weld from the inside diameter surface of the inner tube.

Another technical advantage of the process is that the process significantly reduces the cost of producing the double wall tube as the cost of orbital welding is generally about one third of the brazing process.

Another technical advantage of the process is elimination of the post brazing inspection requirement and the risk of leakage is virtually eliminated.

There has been provided a joining process. While the process has been described in the context of specific embodiments thereof, other unforeseen alternatives, modifications, and variations may become apparent to those skilled in the art having read the foregoing description. Accordingly, it is intended to embrace those alternatives, modifications, and variations which fall within the broad scope of the appended claims.

What is claimed is:

1. A process of welding fittings to ends of a double wall pipe comprising:
    placing an assembly of a second fitting and an inner pipe and an outer pipe into a fixture;
    said fixture comprising:
    a set of collets configured to retain said assembly of said second fitting and said inner pipe and said outer pipe;
    a backing plate coupled to said set of collets, said backing plate being fluidly coupled to said second fitting; and
    a conduit fluidly coupled to said backing plate; said conduit configured to fluidly couple a gas source to said backing plate;
    forming a first welded joint between the inner pipe and an inner receiver of a first fitting;
    forming a second welded joint between the outer pipe and an outer receiver of said first fitting;
    forming a third welded joint between said outer pipe and an outer receiver of the second fitting; and
    forming a fourth welded joint between said inner pipe and an inner receiver of said second fitting.

2. The process according to claim 1, wherein said fourth welded joint comprises a welded lap fillet joint or a full penetration groove welded joint.

3. The process according to claim 1, wherein said gas source comprises an inert shielding gas, further comprising:
    flowing the inert shielding gas through the conduit to a groove formed in said backing plate;
    flowing the inert shielding gas from said groove through said second fitting into a chamber formed between said inner pipe and said outer pipe to protect said fourth welded joint.

4. The process according to claim 1, further comprising:
    installing said fixture within an orbital welding device; and
    aligning a welding electrode with said inner pipe and an inner receiver of said second fitting.

5. The process according to claim 1, further comprising:
    clamping said assembly of said second fitting and said inner pipe and outer pipe in a biasing member formed by said set of collets and said backing plate.

6. The process according to claim 1, further comprising:
    sealing said fourth welded joint between said inner pipe and an inner receiver of said second fitting by using an arc energy to melt either a full or a partial thickness of the fitting with the inner pipe.

7. A welding fixture comprising:
    a set of collets configured to retain an assembly of a second fitting and an inner pipe and an outer pipe;
    a backing plate coupled to said set of collets, said backing plate being fluidly coupled to said second fitting; and
    a conduit fluidly coupled to said backing plate; said conduit configured to fluidly couple a gas source to said backing plate.

8. The welding fixture according to claim 7, further comprising:
    a groove formed in said backing plate, said groove fluidly coupled to said conduit and fluidly coupled to said second fitting.

9. The welding fixture according to claim 7, wherein said fixture is configured to mount into an orbital welding device.

10. The welding fixture according to claim 9, wherein said orbital welding device includes a housing supporting an orbital welding head and adaptor configured to mount a welding electrode proximate an inner diameter of a joint between said inner pipe and an inner receiver of said fitting.

11. The welding fixture according to claim 10, wherein said welding electrode is configured to form a welded lap fillet joint between said inner pipe and said inner receiver of said fitting.

12. The welding fixture according to claim 11, wherein said welding electrode is positioned relative to said inner pipe inner diameter and configured for making a radially outward weld in a gap between the inner pipe and the fitting, wherein said gap is sealed by melting either a full or a partial thickness of the fitting with the inner pipe.

13. A process of joining a double walled pipe with a fitting comprising:
    placing an assembly of a fitting and an inner pipe and an outer pipe into a fixture, wherein said fitting and said outer pipe have a first welded joint;
    mounting said fixture into an orbital welding device;
    positioning a welding electrode relative to an inner diameter of said inner pipe proximate an inner receiver of said fitting; and
    forming a second welded joint between said inner pipe and said inner receiver.

14. The process of claim 13, wherein said second welded joint is formed with a radially outward weld in a gap between the inner pipe and inner receiver of the fitting.

15. The process of claim 13, wherein said second welded joint comprises a welded lap fillet joint or a full penetration groove welded joint.

16. The process of claim 13, wherein said fixture comprises:
    a set of collets configured to retain said assembly of said fitting and said inner pipe and outer pipe;
    a backing plate coupled to said set of collets, said backing plate being fluidly coupled to said fitting; and
    a conduit fluidly coupled to said backing plate; said conduit configured to fluidly couple a gas source to said backing plate;
    flowing the inert shielding gas through the conduit to a groove formed in said backing plate; and
    flowing the inert shielding gas from said groove through said fitting into a chamber formed between said inner pipe and said outer pipe to protect said second welded joint.

17. The process of claim 13, further comprising:
    making said second weld as a radially outward weld in a gap between the inner pipe and the inner receiver of the fitting, wherein said gap is sealed by melting either a full or a partial thickness of the inner receiver of the fitting with the inner pipe.

18. The process of claim 13, wherein said second weld comprises one of an orbital welding technique or a manual gas tungsten arc welding technique.

* * * * *